US008310086B2

(12) United States Patent
Ito et al.

(10) Patent No.: US 8,310,086 B2
(45) Date of Patent: Nov. 13, 2012

(54) VEHICULAR POWER SYSTEM

(75) Inventors: Jun Ito, Toyota (JP); Tsuguhiro Shiono, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 244 days.

(21) Appl. No.: 12/739,320

(22) PCT Filed: Oct. 22, 2008

(86) PCT No.: PCT/IB2008/002966

§ 371 (c)(1),
(2), (4) Date: Apr. 22, 2010

(87) PCT Pub. No.: WO2009/053837

PCT Pub. Date: Apr. 30, 2009

(65) Prior Publication Data

US 2010/0244557 A1 Sep. 30, 2010

(30) Foreign Application Priority Data

Oct. 23, 2007 (JP) ................................ 2007-275283

(51) Int. Cl.
*B60L 1/00* (2006.01)
*B60L 3/00* (2006.01)
*H02G 3/00* (2006.01)

(52) U.S. Cl. ...................................... 307/10.1; 307/10.6

(58) Field of Classification Search ................. 307/10.1, 307/10.3, 10.6

See application file for complete search history.

(56) References Cited

U.S. PATENT DOCUMENTS

2004/0004398 A1 1/2004 Nagasaka et al.
2005/0029871 A1* 2/2005 Mori et al. .................. 307/10.3

FOREIGN PATENT DOCUMENTS

| | | | |
|---|---|---|---|
| CN | 1479009 | A | 3/2004 |
| EP | 1 357 003 | | 10/2003 |
| JP | 2006 77592 | | 3/2006 |
| JP | 2006 132501 | | 5/2006 |
| JP | 2006 298248 | | 11/2006 |
| JP | 2007 15501 | | 1/2007 |

OTHER PUBLICATIONS

Office Action issued May 13, 2011, in China Patent Application No. 200880112941.7 (with English translation).

* cited by examiner

*Primary Examiner* — Carlos Amaya

(74) *Attorney, Agent, or Firm* — Oblon, Spivak, McClelland, Maier & Neustadt, L.L.P.

(57) ABSTRACT

A vehicular power system, which has an operating switch for making the transition among an ON state in which an IG power is ON or a vehicular power source is ON, an ACC state which is different from the ON state and in which an accessory power is ON, and an OFF state in which the vehicular power source and the accessory power are OFF, wherein when the operating switch is operated while a shift lever is in a parking position in the ACC state after the transition from the OFF state, the transition is made from the ACC state to the ON state.

13 Claims, 6 Drawing Sheets

FIG. 2A
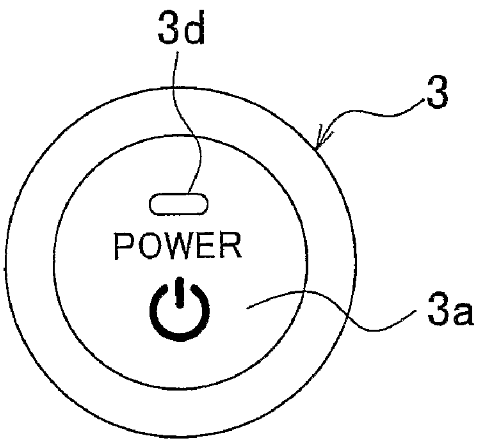
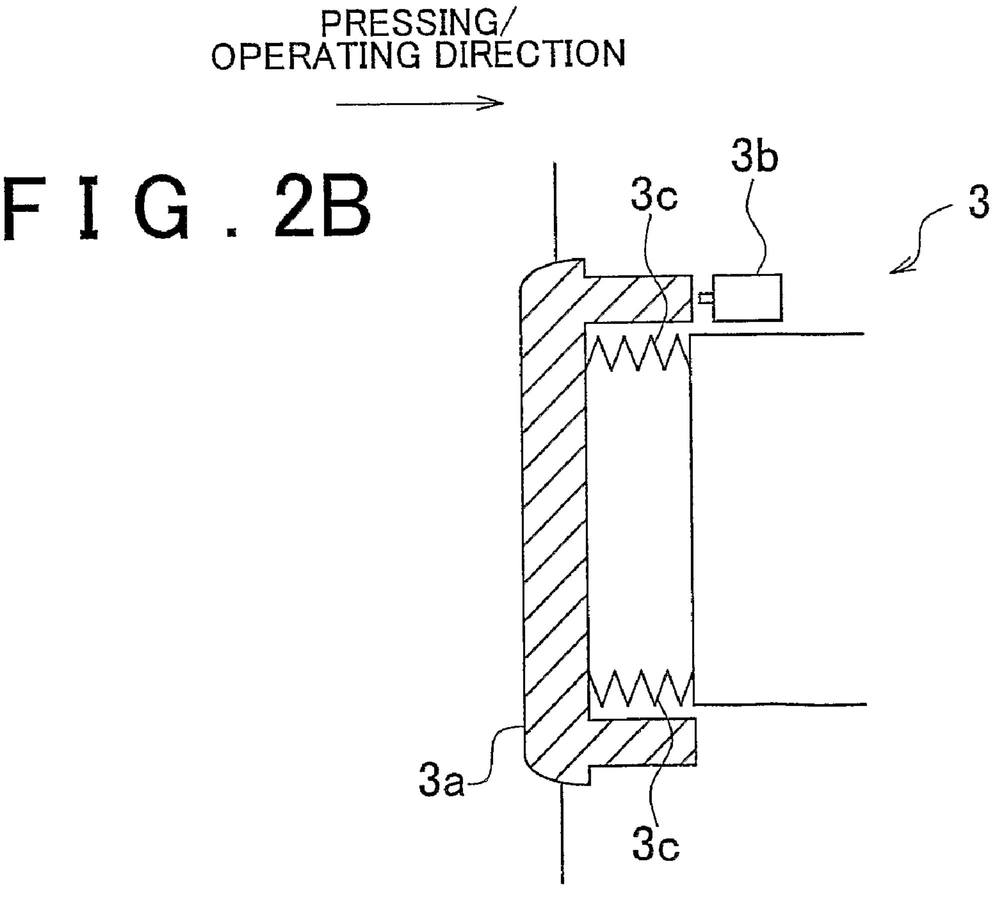
FIG. 2B

VEHICULAR POWER SYSTEM

BACKGROUND OF THE INVENTION

1. Field of the Invention

This invention relates to a vehicular power system.

2. Description of the Related Art

A method of inserting a mechanical key into a key cylinder and turning the key to start the engine has been used as an engine start operation for a vehicle. In recent years, however, a push start system for starting the engine by a pressing operation or a touching operation of a push type switch (engine switch) has been adopted.

Incidentally, the mechanical key can be turned in two directions, right and left, one being a direction for starting the engine and the other for stopping the engine. These rotational angles allow to freely switch between electricity supply states (OFF state, ACC state). In the push start system, on the other hand, only one operation of pressing the engine switch is performed, and the number of pressing operations makes a transit from an electricity supply state to the other. Furthermore, the information on the position of the shift lever or on whether the brake pedal is pressed or not generally determines a target electricity supply state to transit (see FIG. 4 of Japanese Patent Application Publication No. 2006-77592 (JP-A-2006-77592)).

However, in this general push start system, even if the engine switch is pressed during an ON state (engine starting state or IG-ON state) when the shift lever is in a position other than a P range, the vehicle is not in the OFF state for antitheft purposes but in the ACC state, as described in FIG. 4 of the above JP-A-2006-77592. Therefore, when a user wishes to switch the vehicle from the ACC state to the OFF state, the user needs to shift the shift lever to the P range, press the engine switch to bring the vehicle to the ON state, and then press the engine switch again (in other words, the user needs to shift the shift lever to the P range and press the engine switch twice). Such operations are difficult for the user to understand but have room for improvement in point of convenience.

SUMMARY OF THE INVENTION

The invention provides a vehicular power system, which is easy to operate and capable of switching between electricity supply states in a highly convenient form.

A first aspect of the invention relates to a vehicular power system, which has a vehicular power having an IG power and an accessory power and supplying electricity to a vehicle, and an operating switch for making the transition among an ON state in which the IG power is ON or a vehicular power source is ON, an ACC state in which the accessory power is ON, and an OFF state in which the vehicular power source and the accessory power are OFF. In this vehicular power system, a condition for making the transition from the ACC state to a subsequent state varies between the ACC state after the transition from the ON state and the ACC state after the transition from the OFF state.

In the vehicular power system, when the operating switch is operated while a shift lever is in a parking position in the ACC state after the transition from the ON state, the transition may be made from the ACC state to the OFF state, and when, on the other hand, the operating switch is operated while the shift lever is in the parking position in the ACC state after the transition from the OFF state, the transition may be made from the ACC state to the ON state.

Moreover, when the operating switch is operated while the shift lever is in the parking position in the ACC state after the transition from the ON state, the transition may be made from the ACC state to the OFF state, and when, on the other hand, the operating switch is operated while the shift lever is in a position other than the parking position in the ACC state after the transition from the ON state, the transition may be made from the ACC state to the ON state.

When the operating switch is operated while the shift lever is in the parking position during the ON state, the transition may be made from the ON state to the OFF state, and when, on the other hand, the operating switch is operated while the shift lever is in the position other than the parking position during the ON state, the transition may be made from the ON state to the ACC state, and also when the position of the shift lever is changed to the parking position during the ACC state after the transition, the transition may be made from the ACC state to the OFF state without waiting for the operating switch to be operated.

A second aspect of the invention relates to a vehicular power system, which has an operating switch for making the transition among an ON state in which an IG power is ON or a vehicular power source is ON, an ACC state in which an accessory power is ON, and an OFF state in which the vehicular power source and the accessory power are OFF, the transition being made from the ON state to the ACC state when the operating switch is operated while a shift lever is in a position other than a parking position during the ON state. In this vehicular power system, when a predetermined operation is detected during the ACC state after the transition from the ON state, the transition is made to the OFF state.

In the above vehicular power system, the predetermined operation may be both an operation of changing the position of the shift lever to the parking position and an operation of the operating switch, or only the operation of changing the position of the shift lever to the parking position.

A third aspect of the invention relates to a switch unit that has the above vehicular power system. This switch unit further has a controller for realizing the above-described transition.

A fourth aspect of the invention relates to a method of controlling a vehicular power system that has a vehicular power having an IG power and an accessory power and supplying electricity to a vehicle, and an operating switch for making the transition among an ON state in which the IG power and the accessory power are both ON, an ACC state which is different from the ON state and in which the accessory power is ON, and an OFF state in which the IG power and the accessory power are OFF. This control method has the step of determining whether the ACC state is obtained as a result of the transition made from the ON state or from the OFF state, and the step of changing a condition for making the transition from the ACC state to a subsequent state, on the basis of a result of the determination.

The method of controlling the vehicular power system further has the step of detecting whether a shift lever is in a parking position, and the step of making the transition from the ON state to the OFF state when the operating switch is operated while the shift lever is in the parking position.

This invention can provide a vehicular power system, which is easy to operate and capable of switching between the electricity supply states in a highly convenient form.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein:

FIG. 2A is a diagram showing an example of an engine switch 3;

FIG. 2B is a cross-sectional diagram of the engine switch 3 shown in FIG. 2A;

DETAILED DESCRIPTION OF EMBODIMENTS

Embodiments of the invention are described hereinafter with reference to the drawings.

Figure 1:
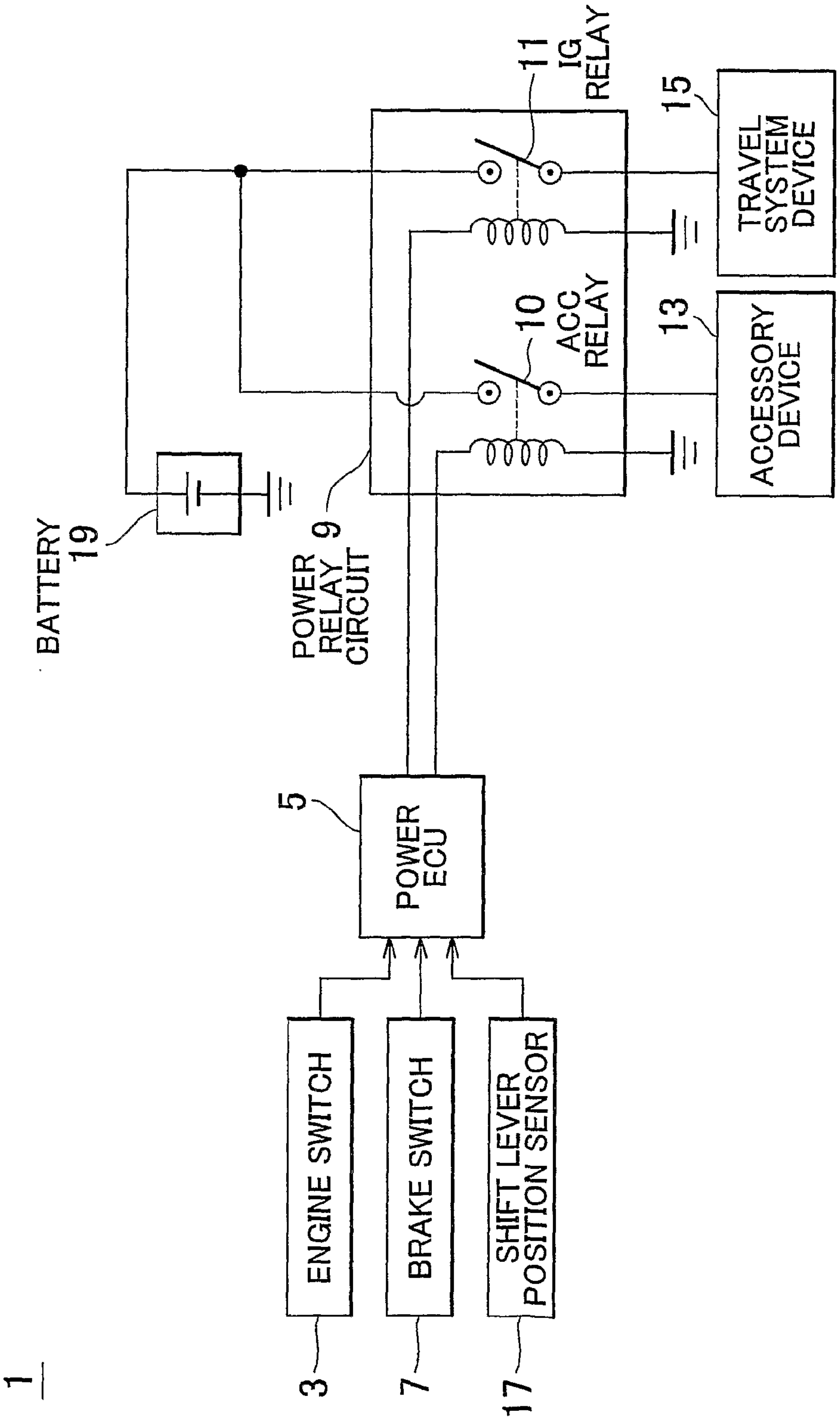
FIG. 1 is a block diagram showing a system configuration of one embodiment of a vehicular power system 1 according to the invention.

FIG. 1 is a block diagram showing a system configuration of one embodiment of a vehicular power system 1 according to the invention. FIG. 2A is a diagram showing an example of a push type switch 3 (to be referred to as "engine switch 3" hereinafter), and FIG. 2B is a cross-sectional diagram of the engine switch 3 shown in FIG. 2A.

The vehicular power system 1 has the engine switch 3 disposed in front of the driver's seat of a vehicle. The engine switch 3 has a cylindrical operating part 3*a* that is pressed and operated by a user, and a switch part 3*b* on which the pressed and operated operating part 3*a* abuts. The operating part 3*a* is slidably supported in a pressing/operating direction and energized by an embedded spring 3*c* in a direction opposite to the pressing/operating direction. A self-return switch is used as the switch part 3*b*. When the user presses and operates the operating part 3*a*, the operating part 3*a* presses the switch part 3*b* to bring the switch part 3*b* to an ON state. On the other hand, after the pressing operation, the operating part 3*a* is energized by the spring 3*c* and consequently returns to its original position, whereby the switch part 3*b* enters an OFF state. Note that the forms of operation on the engine switch 3 may include a normal operation and a special operation such as a long pressing operation of pressing the engine switch 3 for, for example, three or more seconds, but in the following descriptions various expressions indicating the operation of the engine switch 3 (pressing, operating, etc.) mean the normal operation that does not include the long pressing operation and other special operations.

The power ECU 5 for controlling the power of the vehicle is connected to the switch part 3*b* of the engine 3. When the operating part 3*a* of the engine switch 3 is pressed and operated, the switch part 3*b* enters the ON state and an ON signal is output from the engine switch 3 to the power ECU 5 for a predetermined short time. Thereafter, the switch part 3*b* enters the OFF state and an OFF signal is output from the engine switch 3 to the power ECU 5. Specifically, the ON signal is supplied to the power ECU 5 every time the user operates the engine switch 3.

A brake switch 7 is connected to the power ECU 5. The brake switch 7 enters the ON state when a brake pedal is pressed and enters the OFF state when the brake pedal is not pressed. A touch type switch, for example, which is disposed in the vicinity of the brake pedal, is used as the brake switch 7. When the brake is pressed and consequently the brake switch 7 enters the ON state, an ON signal is output to the power ECU 5. When, on the other hand, the brake pedal is released and consequently the brake switch 7 enters the OFF state, an OFF signal is output to the power ECU 5. Note that the ECU 5 may determine based on signals from a master cylinder pressure sensor, a pedal force sensor; and a stop lamp switch whether the brake pedal is pressed or not.

A shift lever position sensor 17 for detecting the position of a shift lever is connected to the power ECU 5. The power ECU 5 determines based on a signal from the shift lever position sensor 17 whether the shift lever is positioned at a P range, N range or other range (e.g., D range).

A power relay circuit 9 is connected to the power ECU 5. The power relay circuit 9 switches an ACC relay 10, IG relay 11 and the like provided in the power relay circuit 9 between the ON state and the OFF state on the basis of a control signal from the power ECU 5. For example, a battery 19 and an accessory device 13 are connected to each other via the ACC relay 10 of the power relay circuit 9. The accessory device 13 is a vehicular electronic device that should be activated in an ACC state, and the examples of the accessory device 13 include an audio device, an illuminating device (e.g., room light), an air conditioner, and the like. Note that the battery 19 may be, for example, a chargeable 12V lead battery. The power ECU 5 transmits the control signal to the power relay circuit 9 and brings the ACC relay 10 to the ON state so that electricity is supplied from the battery 19 to the accessory device 13. As a result, the accessory power is turned ON. On the other hand, the power ECU 5 further supplies the control signal to the power relay circuit 9 and brings the ACC relay 10 to the OFF state to stop the supply of electricity from the battery 19 to the accessory device 13. As a result, the accessory power is turned OFF.

Moreover, a vehicular electronic device 15 other than the accessory device 13 is connected to the batter 19 via the power relay circuit 9. The electronic device 15 may include, for example, the engine, brake, transmission and other device that is in charge of traveling of the vehicle (including the ECU, an actuator, and sensors). Hereinafter, the electronic device 15 is also called "travel system device 15." Note that the electronic device 15 may further include a seat heater or other device that is responsible for providing for comfort and other device such as radar. The power ECU 5 transmits the control signal to the power relay circuit 9 and brings the IG relay 11 to the ON state so that the electricity is supplied from the battery 19 to the travel system device 15. As a result, the IG power is turned ON. On the other hand, the power ECU 5 further transmits the control signal to the power relay circuit 9 and brings the IG relay 11 to the OFF state to stop the supply of electricity from the battery 19 to the travel system device 15. As a result, the IG power is turned OFF.

When an ON signal is supplied from the engine switch 3 to the power ECU 5, the power ECU 5 changes a power supply state according to a certain rule in response to the power supply state, brake pedal operation state and the position of the shift lever that are obtained upon supply of the ON signal. Note that the brake pedal operation state and the position of the shift lever may be determined from information sent from the brake switch 7 and the shift lever position sensor 17.

In this embodiment, the power ECU 5 transits the power supply states between the OFF state, ACC state, IG-ON state and engine starting state. The OFF state means that the TO relay 11 and the ACC relay 10 are both OFF. The ACC state means that the ACC relay 10 is ON but the IG relay 11 is OFF. The IG-ON state means that the IG relay 11 and the ACC relay

10 are both ON but the engine is not started. These three states are realized by controlling the TO relay 11 and the ACC relay 10. The engine starting state means that the IG relay 11 and the ACC relay 10 are both ON and the engine is started. Note that the engine starting state includes an engine operating state in which the engine is operated. The power ECU 5 turns an engine start relay (not shown) ON and thereby activates a starter (not shown) to realize the engine starting state. Note that the IG-ON state and the engine starting state may be substantially the same power supply states except that the engine is or is not activated.

Figure 3:
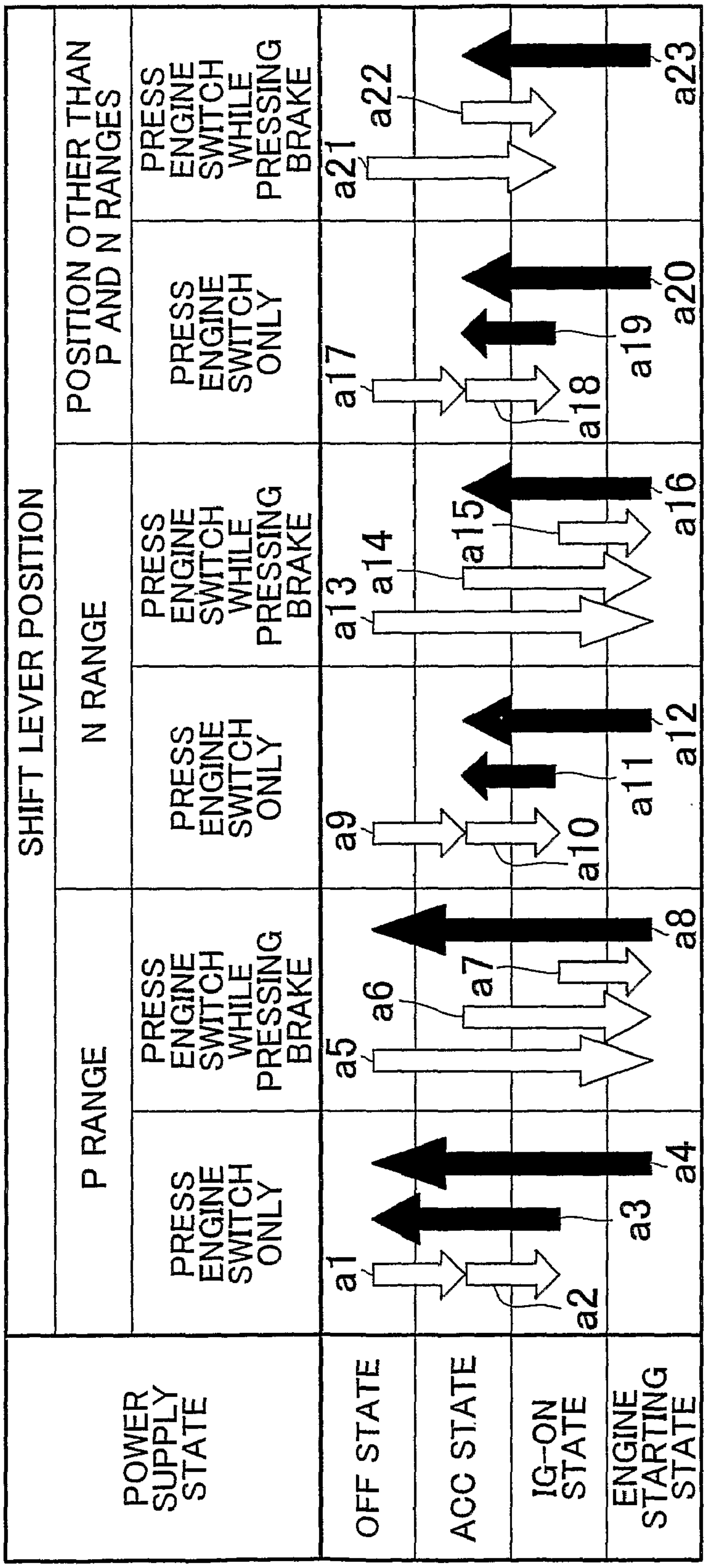
FIG. 3 RELATED ART
FIG. 3 is a diagram showing a conventional art example of the transition form of power supply states.

FIG. 3 shows a related art of an example of the transition form of the power supply states. FIG. 3 shows a form of transiting the states between the OFF state, ACC state, IG-ON state and engine starting state in accordance with the brake pedal operation state and the position of the shift lever. Note that the black arrows of FIG. 3 show the forms of transitions that are allowed only when the vehicle is stopped.

In the related art shown in FIG. 3, when for example, the shift lever is positioned at the P range and the engine switch is pressed without pressing the brake pedal, the OFF state, ACC state and IG-ON state are switched sequentially (a1 to a3). For safety reasons, the switch needs to be pressed while pressing the brake pedal in order to start the engine (a5 to a7). Furthermore, when the shift lever is in the P range, the engine can be stopped simply by pressing the engine switch, regardless of whether the brake pedal is pressed or not (a4, a8). When, on the other hand, the shift lever is positioned at the N range and the engine switch is pressed without pressing the brake pedal, the IG-ON state is switched to not the OFF state but the ACC state (all). Similarly, even when attempting to stop the engine, the OFF state is not realized (a12, a16). Moreover, when the shift lever is positioned at a range other than the P range and the N range (the gear is actuated), the engine cannot be started (a21, a22). The reason that the power supply state is stopped at not the OFF state but the ACC state through the engine switch operation when the position of the shift lever is in the P range is to discourage theft.

Incidentally, in a push start vehicle that uses the engine switch, it is impossible to determine whether the user wishes to switch a certain power supply state to the IG-ON state or to OFF state when operating the switch. Therefore, cyclic transition in which transition is performed in order of the OFF state, the ACC state, the IG-ON state, (engine starting state), and the OFF state has to be adopted as a basic power transition route to be realized. For this reason, in the related art, once the power supply state becomes the ACC state, the power supply state needs to be transited from the ACC state all the way to the OFF state via the IG-ON state (or the engine starting state) because there is no opposite transition route for transiting the power supply state from the ACC state to the OFF state by one operation of the engine switch, as shown in FIG. 3. Therefore, when the user forgets to position the shift lever in the P range and presses the engine switch so as to make the transition from, for example, the IG-ON state to the OFF state, the power supply state enters the ACC state for the antitheft purpose. However, in order to transit the power supply state from the ACC state to the OFF state, the user needs to position the shift lever in the P range and then press the engine switch twice. This process is not necessarily convenient, as it is difficult for the user to remember.

Therefore, as described in detail hereinafter, in this embodiment convenience is improved because, even when the power supply state is transited from the IG-ON state to the ACC state, the power supply state can be transited to the OFF state without going through the IG-ON state by a simple operation. This configuration is described in detail hereinafter.

Figure 4:
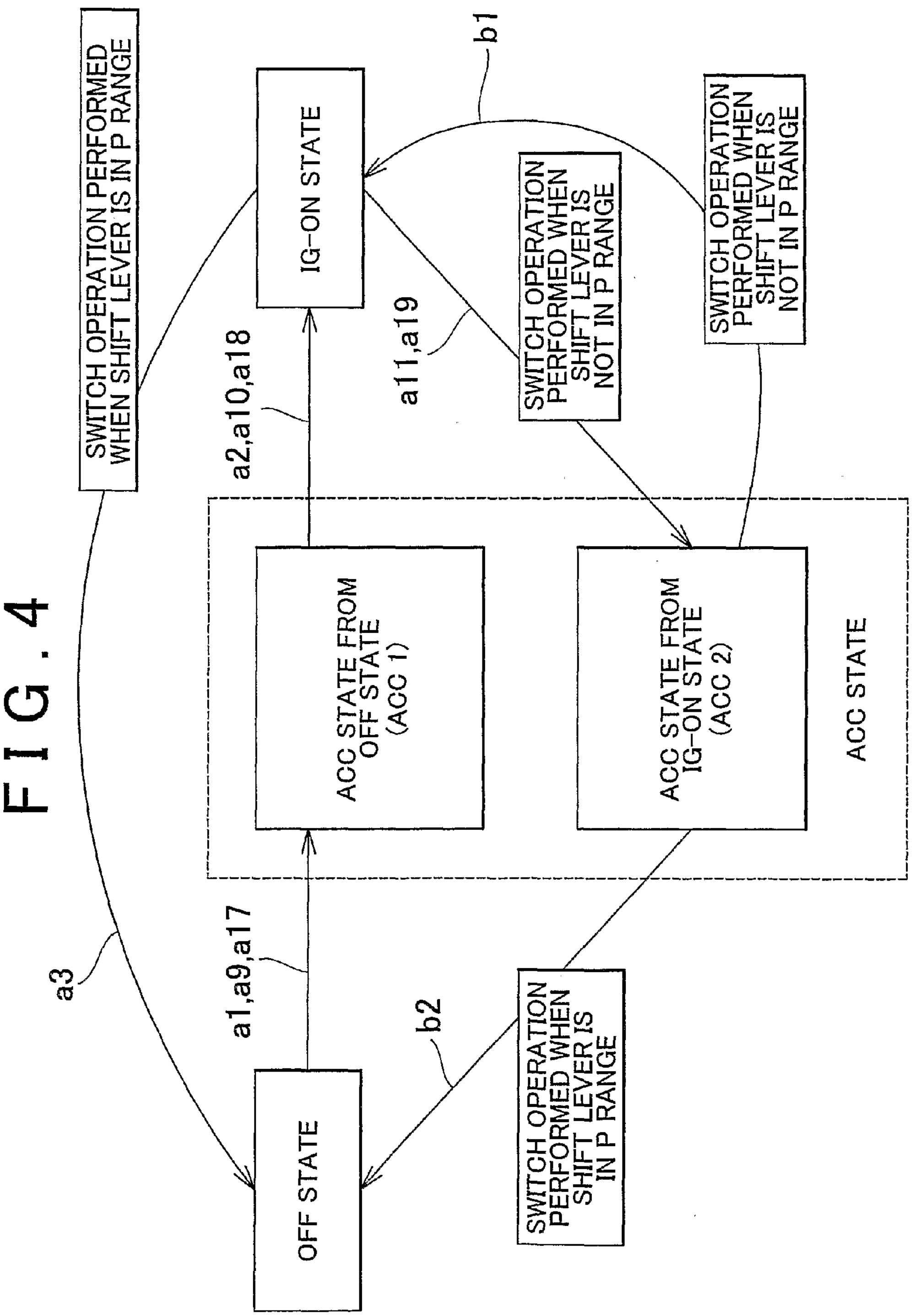
FIG. 4 is a state transition diagram showing an example of a substantial part of the form of power transition.

FIG. 4 is a state transition diagram showing an example of a substantial part of the form of power transition realized by the power ECU 5. In FIG. 4, the arrows show the transitions realized by one operation of the engine switch 3 (sending the ON signal once) under the condition where the brake pedal is not pressed. Also, in FIG. 4 the same reference numerals are used for the same transitions shown in FIG. 3.

In this embodiment, the case in which the transition is made from the OFF state to the ACC state is physically the same power supply state as the case in which the transition is made from the IG-ON state to the ACC as shown in FIG. 4, but they are treated as different cases in terms of control. Here, the ACC state that is obtained as a result of the transition made from the OFF state is called "ACC1" and the ACC state that is obtained as a result of the transition made from the IG-ON state is called "ACC2." For example, when the transition is realized from the IG-ON state or the OFF state to the ACC state by the operation of the engine switch 3, the power ECU 5 may set a flag corresponding to the state obtained before the transition is made to the ACC state (i.e., the IG-ON state or the OFF state), to understand if the current ACC state is ACC1 or ACC2.

In the example shown in FIG. 4, when the engine switch 3 is pressed without positioning the shift lever at the P range in ACC2, the transition is made to the IG-ON state (b1), as with the operation performed on the engine switch 3 in ACC1 (a10, a18). On the other hand, when the shift lever is positioned at the P range and the engine switch 3 is pressed in ACC2, the transition is made to the OFF state (b2), unlike the operation performed on the engine switch 3 in ACC1 (a2). More specifically, in a case where the ON signal is supplied once from the engine switch 3 when the current ACC state is in ACC2, the power ECU 5 brings the IG relay 11 to the ON state while the shift lever is currently positions in a position other than the P range, to make the transition to the IG-ON state. On the other hand, in a case where the ON signal is supplied once from the engine switch 3 when the current ACC state is in ACC2, the power ECU 5 brings the ACC relay 10 to the OFF state while the shift lever is currently in the P range, to make the transition to the OFF state.

Therefore, according to the example shown in FIG. 4, in a case where the user forgets to position the shift lever in the P range and presses the engine switch when attempting to make the transition from the IG-ON state to the OFF state, the ACC state is obtained for antitheft reasons. However, in order to make the transition from the ACC state to the OFF state, simply the shift lever is positioned in the P range and the engine switch 3 is pressed only once. Because this operation is similar to the redo operation, it is easy for a general user to remember. Furthermore, one-time operation of the engine switch 3 is enough, and thus the convenience of the embodiment is improved.

Figure 5:
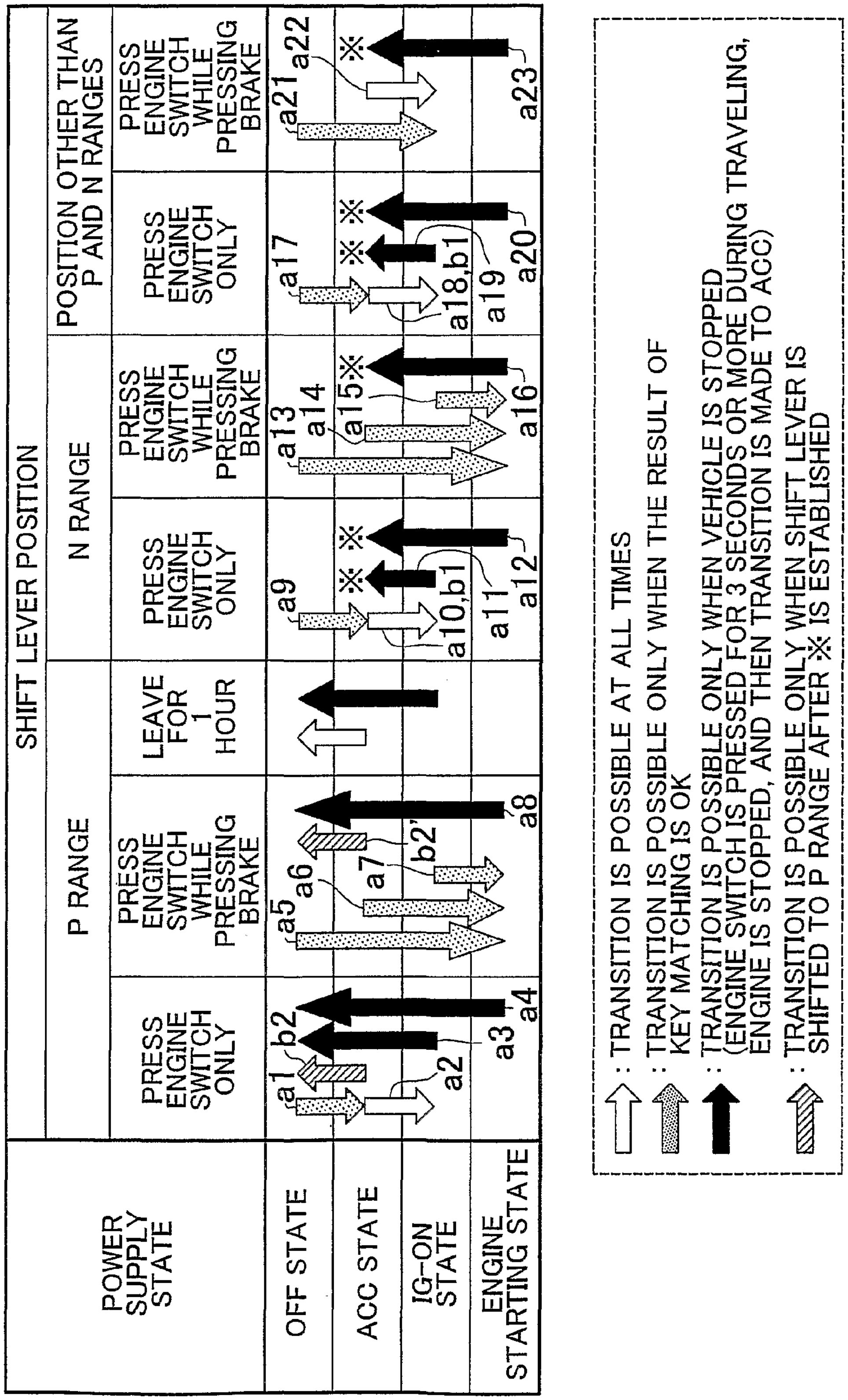
FIG. 5 is a diagram showing an example of the transition form of power supply states according to the embodiment.

FIG. 5 is a diagram showing the entire transition, including a substantial part of the form of power transition shown in FIG. 4. In FIG. 5, the same reference numerals are used for the same transitions shown in FIGS. 3 and 4. Note in FIG. 5 that the transitions a1, a5 and the like and the transitions shown by the same hatched arrows can be realized only when the result of key matching is OK, as described in the dotted line region. This is the transition that is allowed based on, for example, the assumption that an ID code obtained through a wireless communication with a smart key possessed by the user matches a regular ID code.

In the example shown in FIG. 4, the transition b2 is realized by a predetermined operation when the brake pedal is not pressed (operation of changing the position of the shift lever to the P range and pressing the engine switch 3). However, the transition b2 may also be realized by the same predetermined operation when the brake pedal is pressed (see b2' in FIG. 5). Alternatively, in a case in which the position of the shift lever is changed to the P range and the engine switch 3 is operated, and also the brake pedal is pressed in ACC2, the transition to the engine starting state may be realized (see a6 in FIG. 5).

Furthermore, in the example shown in FIG. 4, the ACC state that is obtained as a result of the transition made from the IG-ON state is taken as "ACC2," but the ACC state that is obtained as a result of the transition from the engine starting state (see a12, a16, a20, a23 in FIG. 5) may also be taken as ACC2. Specifically, when the shift lever is positioned in the P range and the engine switch 3 is pressed in the ACC state after the transition from the engine starting state, the transition may be made to the OFF state (see * in FIG. 5).

Figure 6:
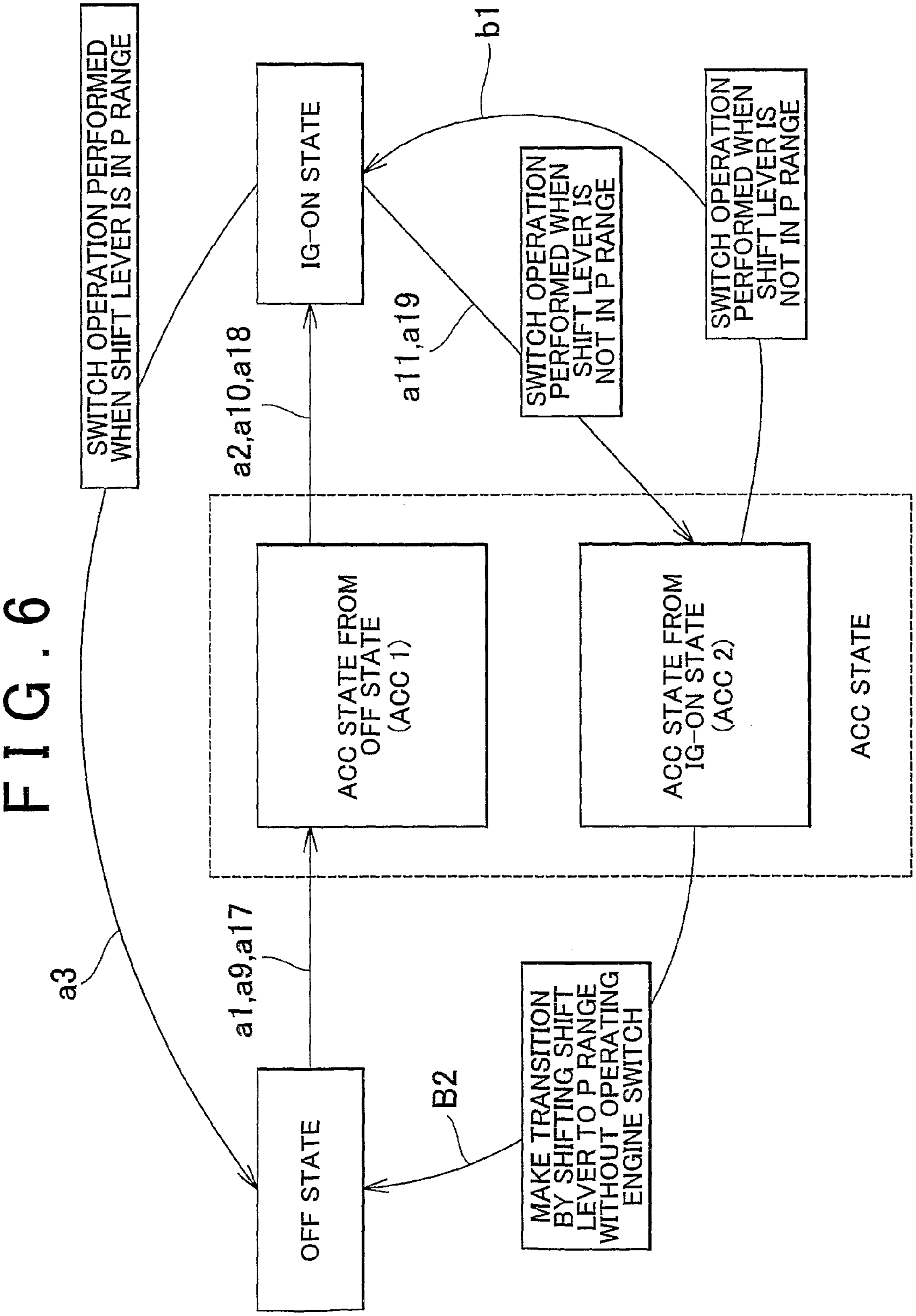
FIG. 6 is a state transition diagram showing another example of the substantial part of the form of power transition realized by a power electronic control unit (ECU) 5.

FIG. 6 is a state transition diagram showing another example of the substantial part of the form of power transition realized by the ECU 5. As with FIG. 4, in FIG. 6 the arrows show the transitions realized by one operation of the engine switch 3 (sending the ON signal once) under the condition where the brake pedal is not pressed. Also, in FIG. 6 the same reference numerals are used for the same transitions shown in FIGS. 3 and 4.

The similarity between the example shown in FIG. 4 and the example shown in FIG. 6 is that they both have the transition route from ACC2 to the OFF state, but the difference is that, in FIG. 6, the transition from ACC2 to the OFF state is realized by a simpler operation. Specifically, in the example shown in FIG. 6, when the shift lever is positioned in the P range in ACC2 the transition is made to the OFF state without operating the engine switch 3 (B2). In other words, in a case where the position of the shift lever is changed to the P range when the current ACC state is ACC2, the power ECU 5 brings the ACC relay 10 to the OFF state to thereby make the transition to the OFF state. In so doing, the power ECU 5 may make the transition to the OFF state after a predetermined time ΔT (five seconds, for example) elapses since the position of the shift lever is changed to the P range. This is because changing the position of the shift lever to the P range and making the transition to the OFF state at the same time might bring discomfort to the user. Moreover, during a standby period (=predetermined time ΔT) before the transition is made to the OFF state, the power ECU 5 may send a notification (announcement) that allows the transition to the OFF state, the notification being, for example, "the power will be turned off shortly". This notification may be realized by voice and/or images using a speaker and/or a display provided in the vehicle.

According to the example shown in FIG. 6; when the user forgets to position the shift lever in the P range and presses the engine switch so as to make the transition from the IG-ON state to the OFF state, the ACC state is obtained for antitheft reasons. However, it is sufficient to change the position of the shift lever to the P range in order to make the transition from the ACC state to the OFF state. Because this operation is similar to the redo operation, it is easy for a general user to remember. Furthermore, because it is not necessary to operate the engine switch 3, the convenience of the embodiment is improved.

Note that in the example shown in FIG. 6, although the transition B2 is realized by a predetermined operation (changing the position of the shift lever to the P range) under the condition where the brake pedal is not pressed, the transition B2 may be realized also when the same predetermined operation is performed under the condition where the brake pedal is pressed.

Moreover, in the example shown in FIG. 6, the ACC state that is obtained as a result of the transition made from the IG-ON state is taken as "ACC2," but the ACC state that is obtained as a result of the transition from the engine starting state may also be taken as ACC2. Specifically, when the position of the shift lever is changed the P range in the ACC state after the transition from the engine starting state, the transition may be made to the OFF state after a lapse of the predetermined time ΔT.

In addition, in the example shown in FIG. 6, when the user performs a predetermined operation during the abovementioned predetermined time ΔT, the transition to the OFF state may be canceled. Specifically, when the user performs a predetermined operation during the abovementioned predetermined time period ΔT, ACC2 may be maintained or the transition may be made to the IG-ON state or the engine starting state in accordance with the predetermined operation. For example, when the engine switch 3 is pressed but the brake pedal is not pressed after the above-mentioned notification (that allows the transition to the OFF state) is sent during the predetermined time ΔT, the transition may be made to the IG-ON state. When the engine switch 3 is pressed and the brake pedal is pressed, the transition may be made to the engine starting state. In this case, a notification to the effect that the transition to the OFF state is canceled may be output. Also, when the position of the shift lever is changed to a position other than the P range after the abovementioned notification (that allows the transition to the OFF state) is sent during the predetermined time ΔT, the transition to the OFF state may be canceled and ACC2 may be maintained. In this case as well, a notification to the effect that the transition to the OFF state is canceled may be output.

Note in the above embodiment that the IG-ON state or the engine starting state corresponds to "ON state."

Moreover, in the above embodiment, because the transition from ACC2 to the OFF state (b2, B2) is made when the shift lever is in the P range, this transition is, naturally, allowed only when the vehicle is stopped.

The above has described the embodiments of the invention. However, the invention is not limited to these embodiments, and various modifications and substitutions can be made to the above-described embodiments without departing from the scope of the invention.

For example, in the embodiments described above, the power ECU 5 may be incorporated in the existing ECU such as an engine ECU or a smart ECU or realized as a new ECU that is different from the existing ECU. The functions of the power ECU 5 may be realized by the cooperation of a plurality of ECUs.

Although the above embodiments did not describe the arrangement of the power ECU 5, the power ECU 5 may be installed in a place different from the engine switch 3 or realized as a switch unit integrated with the engine switch 3.

Moreover, although the above embodiments relate to a vehicle having the engine as a power source for traveling the vehicle, they can be similarly applied to a hybrid vehicle that has not only the engine but also an electric motor as a power source for traveling the vehicle. Also, the invention can be applied to an electric automobile that has only an electric motor as a power source for traveling the vehicle. In the case of an electric automobile, the engine starting state described in the above embodiments may be eliminated and the state transition may be performed among the OFF state, ACC state and IG-ON state. Note that in the IG-ON state the electric motor is activated when the accelerator pedal is pressed. Specifically, in the case of the electric automobile, the IG-ON state in which the electric motor is ON (including a READY state in which the electric motor can be activated) corresponds to the "ON state." Moreover, in the case of the electric automobile, the engine switch may have another appropriate name such as "power switch" or "motor switch."

The invention claimed is:

1. A vehicular power system, comprising:

a vehicular power having an IG power and an accessory power and supplying electricity to a vehicle; and an operating switch that sets the transition among an ON state in which the IG power and the accessory power are both ON, an ACC state which is different from the ON state and in which the accessory power is ON, and an OFF state in which the IG power and the accessory power are OFF, wherein a condition that causes the transition from the ACC state to a subsequent state is different depending on whether the ACC state results from the transition from the ON state and whether the ACC state results from the transition from the OFF state, and wherein the ACC state transitions directly to the OFF state in response to the operating switch being operated, when a shift lever is in a parking position and the ACC state results from the transition from the ON state.

2. The vehicular power system according to claim 1, wherein the ON state includes a state in which a vehicular power source is ON.

3. The vehicular power system according to claim 1, wherein when the operating switch is operated while the vehicle is stopped in the ACC state resulting from the transition from the ON state, the condition is to cause the transition from the ACC state to the OFF state.

4. The vehicular power system according to claim 1, wherein when the operating switch is operated while the shift lever is in the parking position in the ACC state resulting from the transition from the OFF state, the condition is to cause the transition from the ACC state to the ON state.

5. The vehicular power system according to claim 1, wherein when the operating switch is operated while the shift lever is in a position other than the parking position in the ACC state resulting from the transition from the ON state, the condition is to cause the transition from the ACC state to the ON state.

6. The vehicular power system according to claim 1, wherein when the operating switch is operated while the shift lever is in position other than the parking position during the ON state, the condition is to cause the transition from the ON state to the ACC state, and when the position of the shift lever is changed to the parking position during the ACC state resulting from the transition, the condition is to cause the transition from the ACC state to the OFF state without waiting for the operating switch to be operated.

7. A switch unit, comprising the vehicular power system according to claim 1.

8. A vehicular power system, which has an operating switch for making the transition among an ON state in which an IG power is ON or a vehicular power source is ON, an ACC state which is different from the ON state and in which an accessory power is ON, and an OFF state in which the IG power, the vehicular power source and the accessory power are OFF, the transition being made from the ON state to the ACC state when the operating switch is operated while a shift lever is in a position other than a parking position during the ON state, wherein, when a predetermined operation is detected during the ACC state after the transition from the ON state, the transition is made to the OFF state, and wherein the predetermined operation includes both an operation of changing the shift lever to the parking position and an operation of the operating switch, or only the operation of changing the position of the shift lever to the parking position.

9. The vehicular power system according to claim 8, wherein when the operation of the changing position of the shift lever to the parking position is detected, the transition is made to the OFF state after a predetermined time elapses since this changing operation is detected.

10. The vehicular power system according to claim 9, wherein a notification to the effect that the transition is made to the OFF state is made during the predetermined time.

11. A switch unit, comprising the vehicular power system according to claim 8.

12. A method of controlling a vehicular power system that comprises a vehicular power having an IG power and an accessory power and supplying electricity to a vehicle and an operating switch that sets the transition among an ON state in which the IG power and the accessory power are both ON, an ACC state which is different from the ON state and in which the accessory power is ON, and an OFF state in which the IG power and the accessory power are OFF, the method comprising:

determining whether the ACC state is obtained as a result of the transition from the ON state and whether the ACC state is obtained as a result of the transition from the OFF state; and changing a condition that causes the transition from the ACC state to a subsequent state, on the basis of a result of the determination, the ACC state transitioning directly to the OFF state in response to the operating switch being operated, when a shift lever is in a parking position and the ACC state results from the transition from the ON state.

13. The method of controlling a vehicular power system according to claim 12, further comprising:

detecting whether the shift lever is in the parking position; and making the transition from the ON state to the OFF state when the operating switch is operated while the shift lever is in the parking position.

* * * * *